United States Patent
Prabhakaran

(10) Patent No.: US 11,061,866 B2
(45) Date of Patent: Jul. 13, 2021

(54) SMART FOLDER SCAN SYSTEM AND METHOD

(71) Applicant: DRUVA INC., Sunnyvale, CA (US)

(72) Inventor: Nair Ranjit Prabhakaran, Pune (IN)

(73) Assignee: Druva Inc., Sunnyvale, CA (US)

( * ) Notice: Subject to any disclaimer, the term of this patent is extended or adjusted under 35 U.S.C. 154(b) by 574 days.

(21) Appl. No.: 15/912,729

(22) Filed: Mar. 6, 2018

(65) Prior Publication Data
US 2019/0138619 A1    May 9, 2019

(30) Foreign Application Priority Data

Nov. 9, 2017 (IN) ............................ 2017 4 1039917

(51) Int. Cl.
| | |
|---|---|
| *G06F 16/00* | (2019.01) |
| *G06F 16/17* | (2019.01) |
| *G06F 3/06* | (2006.01) |
| *G06F 16/22* | (2019.01) |
| *G06F 16/16* | (2019.01) |

(52) U.S. Cl.
CPC .......... *G06F 16/1734* (2019.01); *G06F 3/067* (2013.01); *G06F 3/0653* (2013.01); *G06F 16/16* (2019.01); *G06F 16/2282* (2019.01)

(58) Field of Classification Search
CPC .......................... G06F 16/1734; G06F 16/2282
USPC .......................................................... 707/640
See application file for complete search history.

(56) References Cited

U.S. PATENT DOCUMENTS

| | | | | |
|---|---|---|---|---|
| 8,352,430 B1* | 1/2013 | Myhill | ................ | G06F 11/1464 707/640 |
| 9,116,915 B1* | 8/2015 | Lakshman | ............ | G06F 16/188 |
| 2014/0244698 A1* | 8/2014 | Bhakta | .................... | G06F 16/13 707/822 |
| 2017/0011073 A1* | 1/2017 | Deshpande | ........... | G06F 16/215 |

* cited by examiner

*Primary Examiner* — Chelcie L Daye
(74) *Attorney, Agent, or Firm* — BakerHostetler

(57) ABSTRACT

A smart folder scan system and method is provided. The system includes a memory having computer-readable instructions stored therein and a storage module having a plurality of file folders configured to store data. The system further includes a processor communicatively coupled to the storage module. The processor is configured to access the plurality of file folders stored in the storage module. In addition, the processor is configured to scan and identify one or more modified file folders stored in the storage module. Further, the processor is configured to generate a folder activity table for each of the plurality of file folders based upon the scan. The folder activity table comprises of a listing of the file folders and an associated modification time for each of the file folders. The processor is further configured to generate a skip table database based upon the modification time of each of the file folders. The skip table database includes a listing of one or more file folders to be skipped from a full scan. In addition, the processor is configured to identify one or more file folders for the full scan based upon the folder activity table and the skip table database. Furthermore, the processor is configured to perform a full scan of the identified one or more file folders.

18 Claims, 6 Drawing Sheets

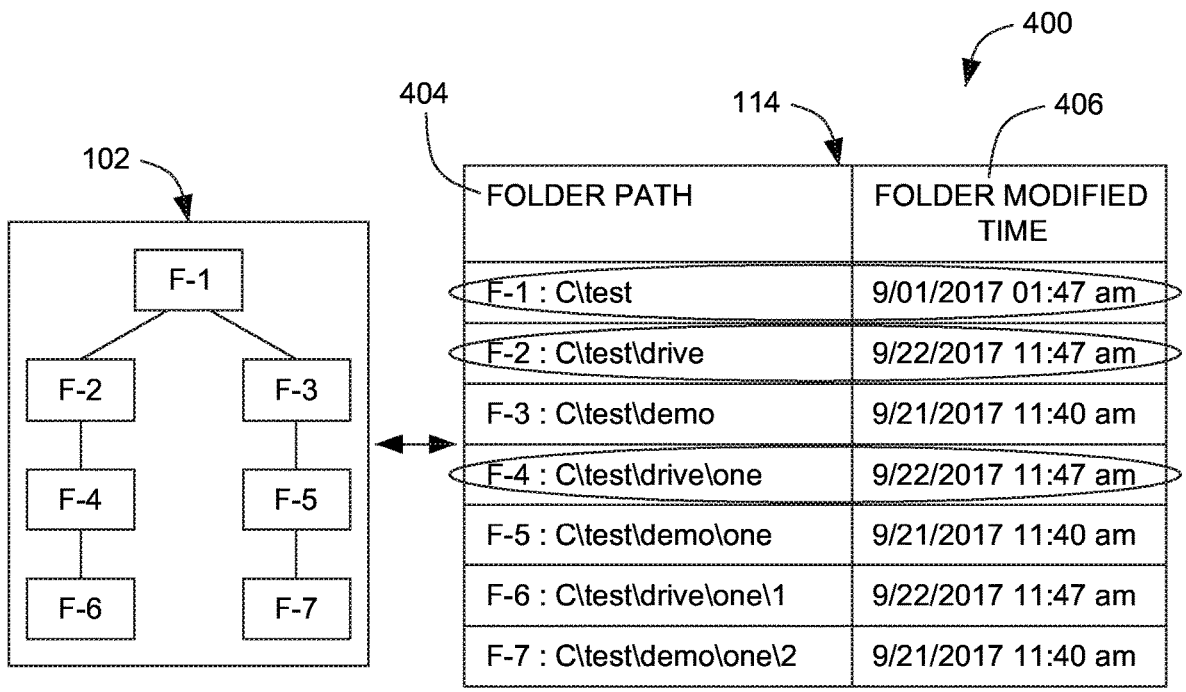
FIG. 4
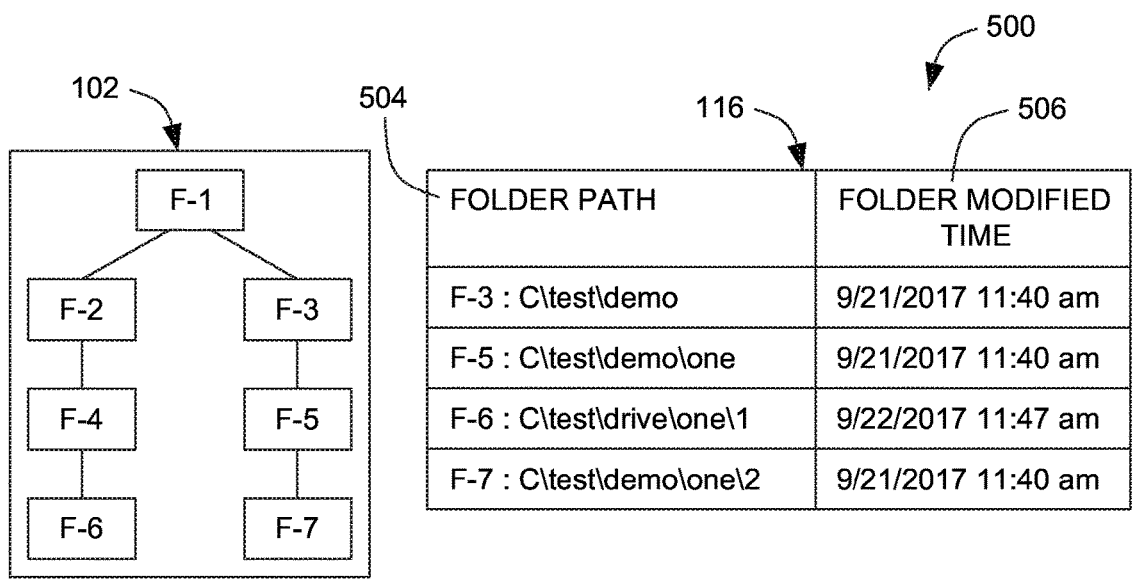
FIG. 5-A

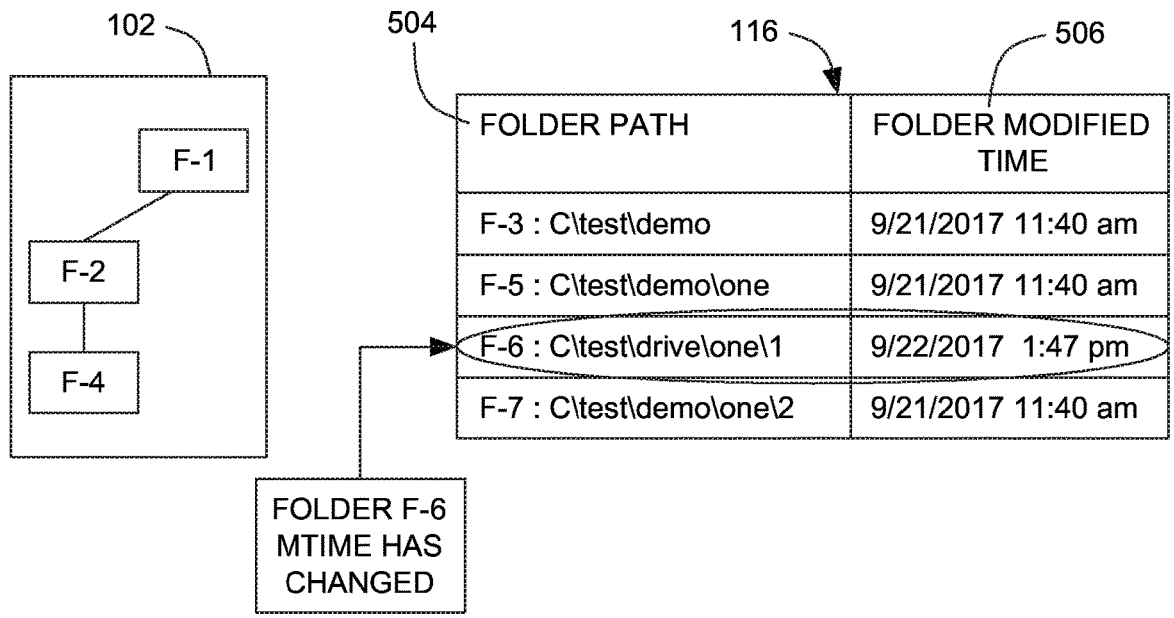
FIG. 5-B
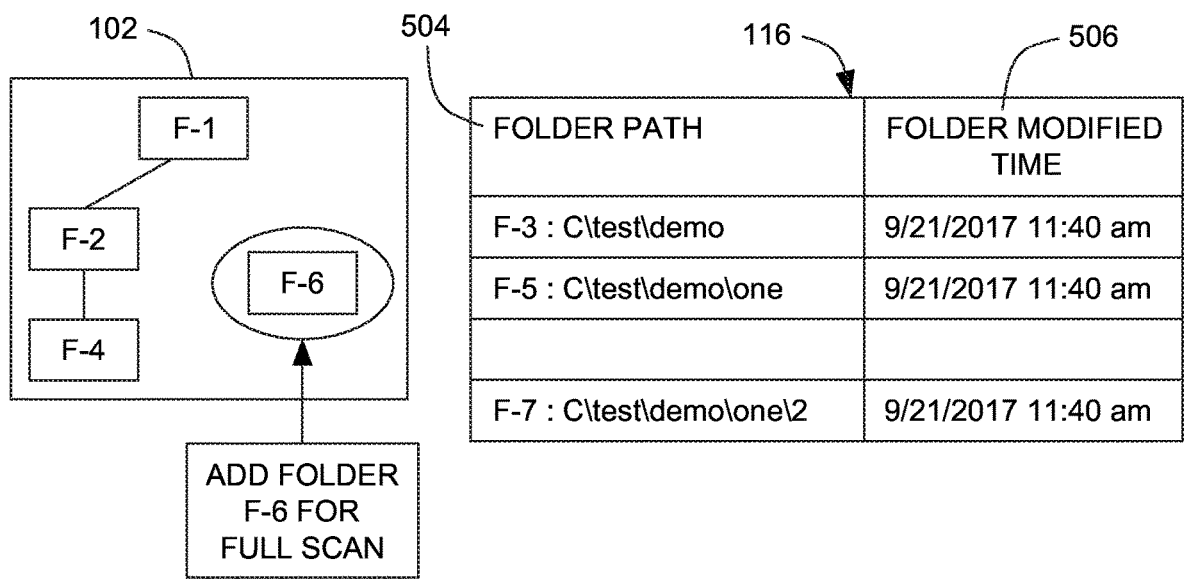
FIG. 5-C

SMART FOLDER SCAN SYSTEM AND METHOD

PRIORITY STATEMENT

The present application hereby claims priority under 35 U.S.C. § 119 to Indian patent application number 201741039917 filed 9 Nov. 2017, the entire contents of which are hereby incorporated herein by reference.

FIELD

Embodiment of invention relates generally to data backup techniques, and more particularly to systems and methods for scan optimization for enhancing data backup speed and efficiency.

BACKGROUND

Modern businesses often rely on computer systems and computer networks. It is undesirable to experience an irretrievable loss of data in such business computer systems. Financial institutions, healthcare organizations and businesses of varied sizes need to back up their data to prevent operational headaches and major setbacks. To prevent loss of data, computer systems are periodically backed up. Backup allows recovery of data in an event such as a system crash, natural disaster, or an operator error that causes data stored on the system to be destroyed or lost.

Most of the existing backup techniques face issues associated with the speed of the backup process, i.e., the time required to execute a backup. Moreover, issues such as power outages, virus infiltration and breached network security can compromise sensitive data. Further, performing regular full system backups can severely limit network bandwidth. In addition, in traditional backup techniques, the data transfer rates are substantially slower than the speed of the system on which the data is stored. Such factors can substantially limit the overall speed of the backup. In addition, in some network systems, the cost of storage media for the backed-up data may also be significant.

One way to reduce transmission time for backup is performing incremental data backups. Scheduling smaller incremental backups saves time and storage space by only scanning the drives for which the files were updated since its last backup. In operation, an initial backup is performed of the entire contents of the computer system. For each subsequent backup, only those files that have changed or created since the last backup are sent to the backup media for storing. In some systems, whether a file has changed is determined by simply comparing the date the file was created or last modified with the date of the last backup. However, in storage systems such as network attached storage (NAS), there is no in-built technology like USN journal for Windows or change block tracking (CBT) for VMware to selectively determine the modified files for a faster and more efficient backup system.

Thus, there is a need for fast and efficient data scanning and backup techniques that would facilitate efficient backup of data without affecting storage system performance or taxing storage system resources.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a smart folder scan system.

Briefly, according to an example embodiment, a smart folder scan system is provided. The system includes a memory having computer-readable instructions stored therein and a storage module having a plurality of file folders configured to store data. The system further includes a processor communicatively coupled to the storage module. The processor is configured to access the plurality of file folders stored in the storage module. In addition, the processor is configured to scan and identify one or more modified file folders stored in the storage module. Further, the processor is configured to generate a folder activity table for each of the plurality of file folders based upon the scan. The folder activity table comprises of a listing of the file folders and an associated modification time for each of the file folders. The processor is further configured to generate a skip table database based upon the modification time of each of the file folders. The skip table database includes a listing of one or more file folders to be skipped from a full scan. In addition, the processor is configured to identify one or more file folders for the full scan based upon the folder activity table and the skip table database. Furthermore, the processor is configured to perform a full scan of the identified one or more file folders.

According to another example embodiment, a method for scanning file folders of a storage module is provided. The method includes accessing a plurality of file folders stored in the storage module. The method further includes scanning the plurality of file folders and identifying one or more modified file folders stored in the storage module. In addition, the method includes generating a folder activity table for each of the plurality of file folders based upon the scan. The folder activity table includes a listing of the file folders and an associated modification time for each of the file folders. Further, the method includes identifying one or more file folders for a full scan based upon the folder activity table. Furthermore, the method includes performing a full scan of the identified one or more file folders.

According to yet another example embodiment, a smart folder scan system is provided. The system includes a memory having computer-readable instructions stored therein. The system further includes a network added storage having a plurality of file folders configured to store data. In addition, the system includes a processor communicatively coupled to the network added storage. The processor is configured to: access the plurality of file folders stored in the network added storage. The processor is further configured to scan and identify one or more modified file folders stored in the network added storage. Moreover, the processor is configured to generate a folder activity table for each of the plurality of file folders based upon the scan. The folder activity table includes a listing of the file folders and an associated modification time for each of the file folders. The processor is further configured to identify one or more file folders for a full scan based upon the folder activity table. In addition, the processor is configured to perform a full scan of the identified one or more file folders.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 4 is an example folder activity table for the file folders present in the storage module of FIG. 1, implemented according to the aspects of present technique;

FIGS. 5-A through FIG. 5-C illustrate example embodiments 500 of identifying and scanning the file folders present in a storage module using the folder activity table in combination with an age-based scan technique, implemented according to the present technique.

DETAILED DESCRIPTION OF EXAMPLE EMBODIMENTS

Figure 1:
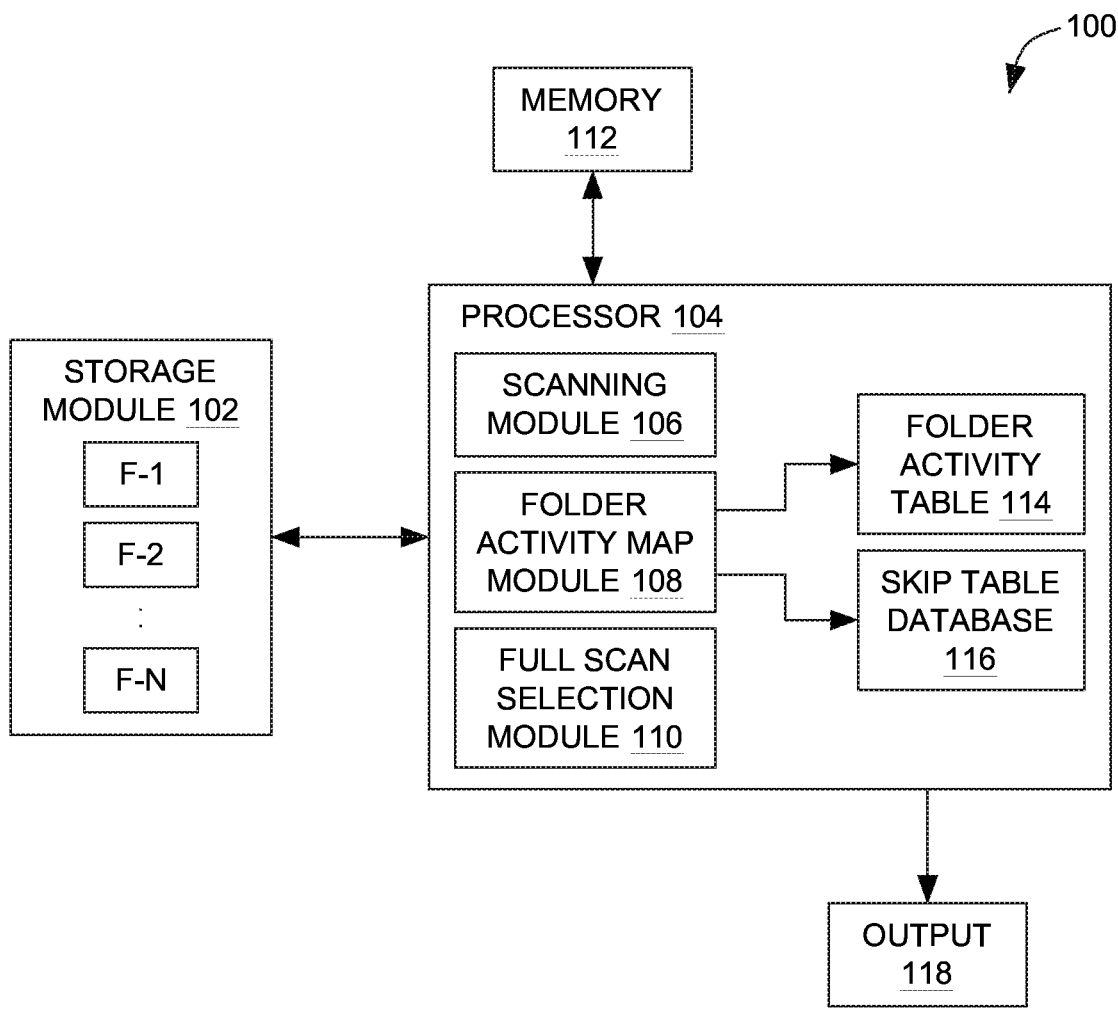
FIG. 1 is an example illustration of a smart folder scan system, implemented according to the aspects of present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software.

Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a smart folder scan system and method for identifying the folders which are added or modified for incremental data backup solutions.

FIG. 1 is an example illustration of a smart folder scan system 100, implemented according to aspects of present technique. The smart folder scan system 100 includes a storage module 102, a processor 104 and a memory 112. The processor 104 further includes a scanning module 106, a folder activity map module 108 and a full scan selection module 110.

The storage module 102 is a computer data storage server having a plurality of file folders such as generally represented by F-1 through F-N. The storage module 102 is configured to store data such as present in various computer systems. In an embodiment, the storage module 102 may be a network added storage (NAS) and may include data files from one or more storage drives or that may be present on various types of network added storage devices. Such data files are organized and stored in a data file system consisting of the plurality of file folders generally represented by F-1 through F-N. It should be noted that the techniques described herein may be applicable to a wide variety of systems with storage devices that do not include tools/API's to track changes in the file folders stored in the storage devices. In particular, the present techniques may be used for storage devices such as Network attached Storage (NAS), Linux and Unix operating systems.

The processor 104 is communicatively coupled to the storage module 102 and is configured to access the plurality of file folders F-1 through F-N stored in the storage module 102. The processor 104 is configured to scan and identify one or more modified file folders (such as F-1 through F-N) stored in the storage module 102. In the illustrated embodiment, the scanning module 106 is configured to scan each of the plurality of file folders F-1 through F-N to identify the one or more modified file folders stored in the storage module 102. In an embodiment, an initial full scan is performed for all the file folders F-1 through F-N present in the storage module 102. In another embodiment, a scan is performed on file folders which have been either recently added or modified.

The folder activity map module 108 is configured to generate a folder activity table 114 for each of the plurality of file folders F-1 through F-N present in the storage module 102 based upon the scan performed by the scanning module 106. In this embodiment, the folder activity table 114 may include a listing of the file folders and an associated modification time for each of the file folders. In addition, the folder activity table 114 may include details such as a folder path, contents of the file folder, and the like. In another embodiment, the folder activity map module 108 is configured to generate a skip table database 116 based upon the modification time of each of the file folders F-1 through F-N. In this example embodiment, the skip table database includes a listing of one or more file folders to be skipped from a full scan.

The full scan selection module 110 is configured to identify one or more file folders that have been recently added or modified based upon the folder activity table 114 and the skip table database 116. Such identified one or more file folders are accessed by the scanning module 106 for a full scan of the file folders. The scanning module 106 may be configured to perform a complete backup scan of the identified file folders. In one embodiment, additional file folders are identified based upon the modification time of the file folders listed in the skip table database 116. In some embodiments, file folders are selected for backup based on a system defined criteria such as age-based scan criteria. It should be noted that age-based scan criteria are built on probability-based algorithms. Such criteria may be user defined. In another embodiment, file folders not identified for scan may include files whose loss would not be critical to the operation of the user system, or the business of the user.

In another embodiment, each folder path present in the folder activity table 114 is scanned to verify a change in the modified time. In case the folder modified time has changed, then all the files present in the file folder are scanned using the scanning module 106. Alternatively, scanning of the files under the respective file folder is skipped. In an embodiment, a full scan of a data set is performed as a first backup of the storage module.

The memory 112 is configured to store the folder activity table 114 generated for each of the file folders (such as F-1 through F-N) present in the storage module 102. In this embodiment, the folder activity table 114 may include details such as a folder name, a folder modified time and a folder path, or combinations thereof for each of the file folders. In another embodiment, the memory is further configured to store the skip table database 116 generated by the folder activity map module 108. In some embodiments, the details of the folder activity table 114 and the skip table database 116 may be made available to a user via output 118.

While FIG. 1 illustrates and the following provides a detailed description of various components/modules of the system 100, example embodiments are not limited thereto. For example, the above-identified modules of the system 100 may be implemented via one or more processors (e.g., processor 104) where the one or more processor is configured to execute computer readable instructions stored on a memory (e.g., memory 112) to carry out the functionalities of each of the above-identified modules.

Figure 2:
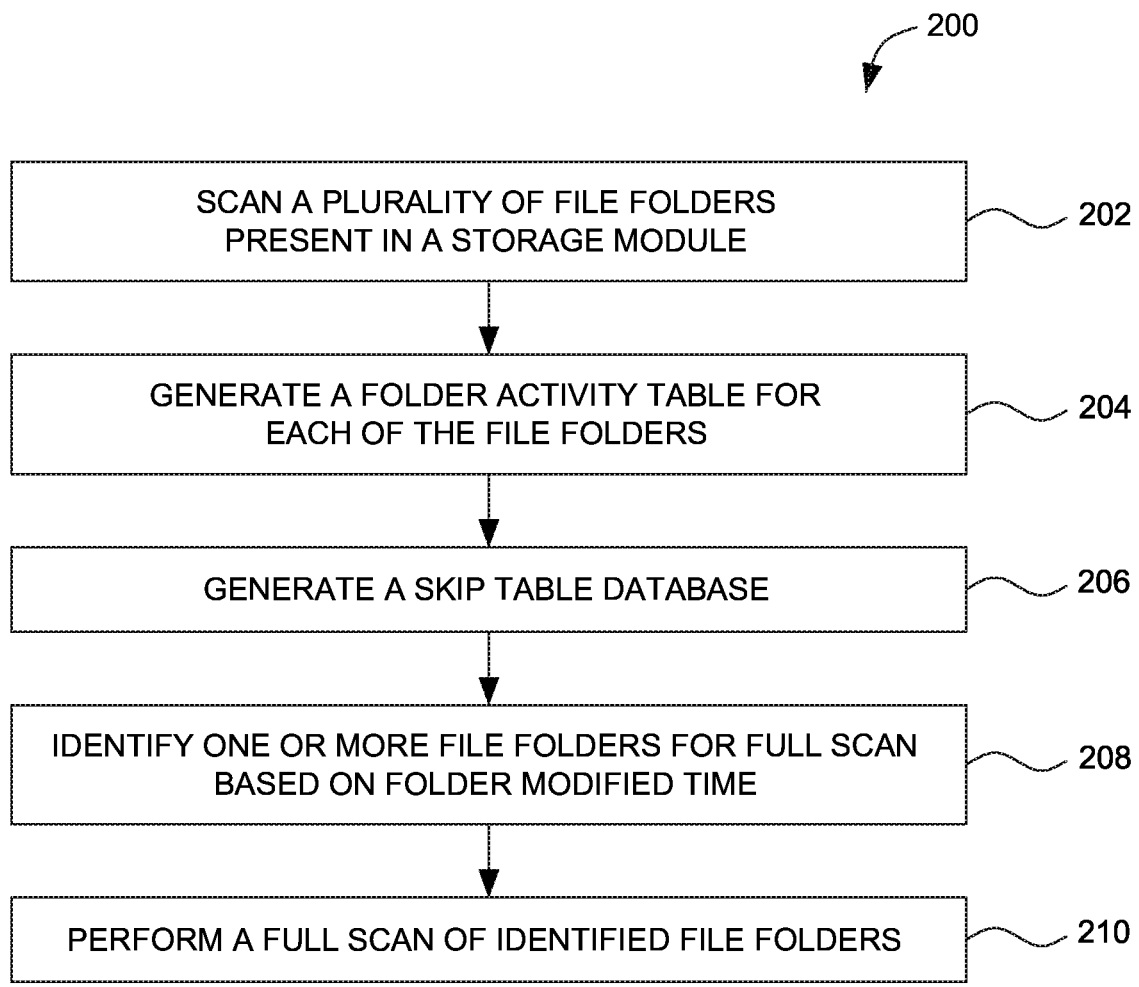
FIG. 2 is a flow diagram illustrating a process for identifying and scanning the file folders present in a storage module, using the smart folder scan system of FIG. 1, according to an example embodiment.

FIG. 2 is a flow diagram 200 illustrating a process for identifying and scanning the file folders present in a storage module, using the smart folder scan system 100 of FIG. 1, according to an example embodiment.

At step 202, each of a plurality of file folders F-1 through F-N, present in a storage module (e.g., storage module 102) are scanned using a scanning module (e.g., scanning module 106). In an embodiment, a full scan is performed for all the file folders F-1 through F-N, present in the storage module 102.

At step 204, a folder activity table (e.g., folder activity table 114) for each of the plurality of file folders F-1 through F-N present in the storage module 102 is generated by a folder activity map module (e.g., folder activity map module 108). In an embodiment, the folder activity table may include a folder name, a folder modification time, a folder path, or combinations thereof for each of the file folders.

At step 206, a skip table database (e.g., skip table database 116) is generated by the folder activity map module based upon the modification time of each of the file folders F-1 through F-N. In an embodiment, the skip table database includes details for one or more file folders that have not been modified over a predetermined period of time. The skip table database may include a listing of one or more file folders to be skipped from a full scan.

At step 208, one or more file folders are identified for full scan using a full scan selection module (e.g., full scan selection module 110) based upon changes in the folder modified time of the respective file folders using the folder activity table. In particular, folders that have been modified recently may be identified for a full scan using the full scan selection module.

At step 210, a full scan of each of the plurality of identified file folders in the folder activity table is performed. In an embodiment, a full scan is performed of the identified file folders in the folder activity table using the scanning module (e.g., scanning module 106). In some embodiments, files folders are selected for backup based on a system defined criteria such as age-based scan criteria. In this embodiment, each folder path present in the folder activity table (e.g., folder activity table 114) is scanned to verify a change in the modified time. In another embodiment, file folders not identified for scan may include files whose loss would not be critical to the operation of the user system, or the business of the user/corporate where the system has been employed.

Figure 3:
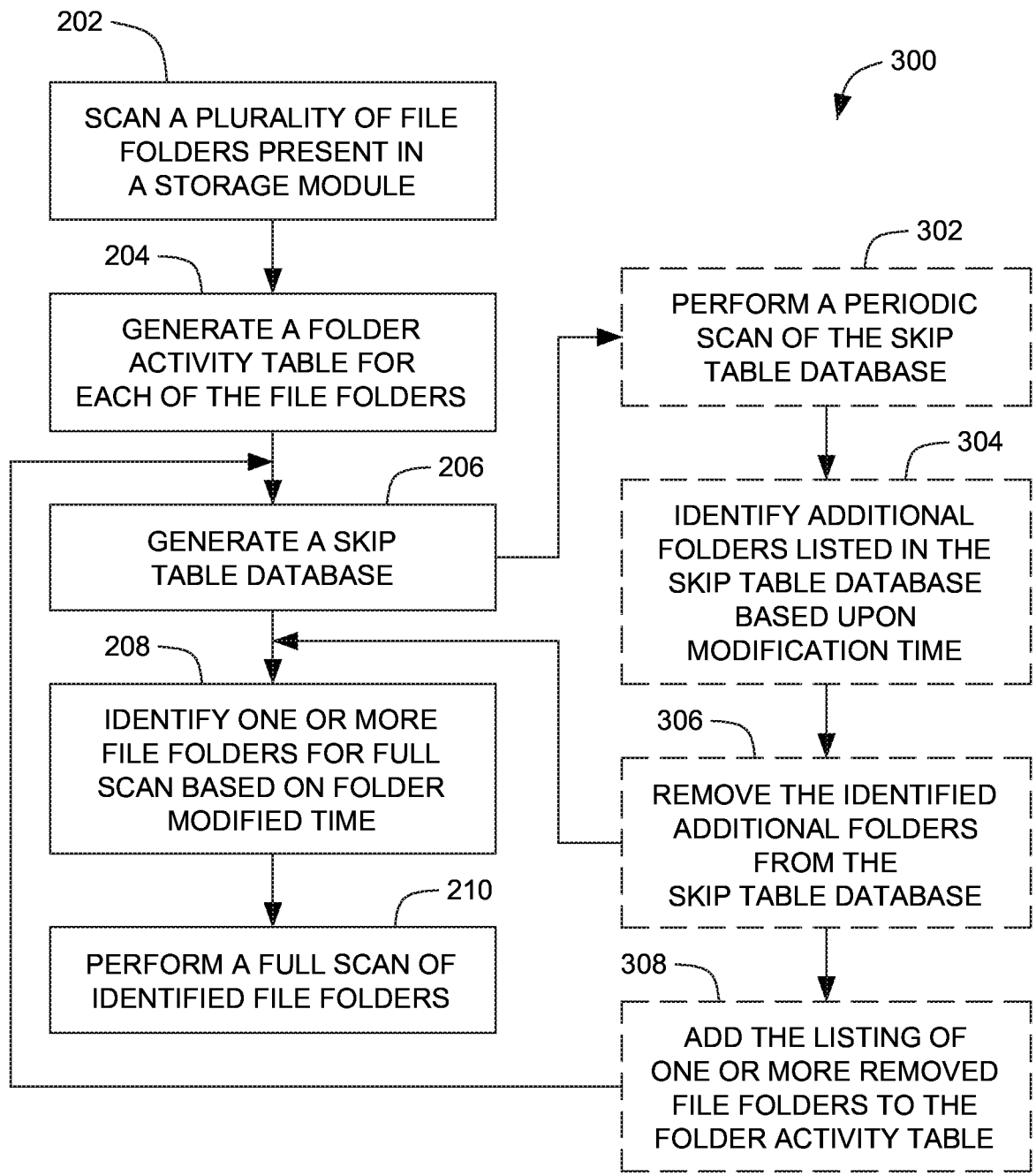
FIG. 3 is a flow diagram of another embodiments of the process of FIG. 2, illustrating a process of a periodic scan implemented using the smart scan system of FIG. 1, according to an example embodiment.

FIG. 3 is a flow diagram another embodiment of the process of FIG. 2, illustrating a process 300 of a periodic scan implemented using the smart scan system of FIG. 1, according to an example embodiment.

As described above with reference to FIG. 2, each of a plurality of file folders F-1 through F-N, present in a storage are scanned using a scanning module (step 202). In an embodiment, a full scan is performed for all the file folders F-1 through F-N, present in the storage module 102. Further, a folder activity table for each of the plurality of file folders F-1 through F-N present in the storage module 102 is generated. (step 204). In addition, a skip table database is generated by the folder activity map module based upon the modification time of each of the file folders F-1 through F-N (step 206).

In addition, at step 302, a periodic scan of the skip table database (e.g., skip table database 116) is performed. In this example embodiment, the skip table database includes a listing of one or more file folders to be skipped from a full scan.

At step 304, additional file folders from the skip table database are identified for back up scan. In an embodiment, one or more additional file folders are identified based upon the modification time of the file folders listed in the skip table database.

At step 306, one or more identified file folders are removed from the skip table database. In this embodiment, if the folder modified time of a file folder in skip table database has changed, the file folder is removed from skip table database.

At step 308, the listing of the one or more removed file folders from the skip table database is added to the folder activity table that may be further selected for a full scan.

Further, as described with reference to FIG. 2, one or more file folders are identified for full scan based upon changes in the folder modified time of the respective file folders using folder activity table (step 208). Further, a full scan of each of the plurality of identified file folders in the folder activity table is performed (step 210). In an embodiment, a full scan is performed of the identified file folders in the folder activity table using the scanning module FIG. 4 is an example folder activity table 400 for the file folders present in the storage module 102 of FIG. 1, implemented according to the aspects of present technique. In this example, a plurality of file folders (such as F1 through F-7), present in storage module (e.g., the storage module 102) are scanned using a scanning module (e.g., scanning module 106). In an embodiment, a full scan is performed for all the file folders as represented by F-1 through F-7 present in the storage module 102.

In a further embodiment, a folder activity table 114 for each of the plurality of file folders F-1 through F-7 is generated. As can be seen, the folder activity table 114 may include the details such as a folder name, a folder path (e.g., folder path 404) and a folder modified time (e.g., folder modified time 406). For example, for the file folder 1, generally represented as F-1, the folder path is acquired and is stored in the folder activity table 114 as "C:\ test" and the folder modified time is stored in the column 406 as "9/01/ 2017 01:47 a.m.". Similarly, for each of the file folders such as F-2, F-3, F-4, F-5, F-6 and F-7, the respective folder path and the folder modified time is stored in the folder activity table 114. Such details available with the folder activity table 114 are used to identify the file folders for full back-up scan.

For example, in the illustrated embodiment, it is determined that the folder modified time of each of the file folders F-1, F-2 and F-4 has changed since the last back-up scan. Therefore, a full back-up scan of file folders F-1, F-2 and F-4 is performed using the scanning module 106 and the remaining file folders such as F-3, F-5, F-6 and F-7 are skipped from performing a full scan.

FIGS. 5-A through FIG. 5-C illustrate example embodiments 500 of identifying and scanning the file folders present in a storage module using the folder activity table in combination with an age-based scan technique, implemented according to the present technique. In an example embodiment illustrated in FIG. 5-A, file folders F-1 through F-7 are identified for a backup scan based on a system defined criteria such as age-based scan techniques. Such criteria may be pre-determined by a user of the system. In an embodiment, a full scan is performed for each of the plurality of file folders F-1 through F-7 using the scanning module (e.g., scanning module 106).

In a further embodiment, the file folders that have not been modified over a period of time are identified using the folder activity map module (e.g., folder activity map module 108). In an embodiment, a skip table database 116 is generated having details for one or more file folders (F-3, F-5, F-6 and F-7) that have not been modified for a predetermined period of time. Such time thresholds may be user-defined. It should be noted that in age-based techniques such file folders may be skipped while performing a full scan.

In this embodiment, the folder modified time of each file folder listed in the skip table database 116 is scanned to ensure no new files were added or modified. As illustrated in FIG. 5-B, the folder modified time for file folder F-6 has changed. In this embodiment, file folder F-6 is removed from the skip table database 116 and is added to the folder activity table 114, as illustrated in FIG. 5C. In another embodiment, a full scan of each of the plurality of identified file folders (F-1, F-2, F-4 and F-6) listed in the folder activity table is performed, while the scanning of the file folders (F-3, F-5 and F-7) present in the skip table database 116 are skipped.

The present techniques provide an efficient way of scanning the file folders present in a system. In particular, a full scan of a data set may be performed in the first backup and subsequent backups may be done using the smart scan techniques described above.

Figure 6:
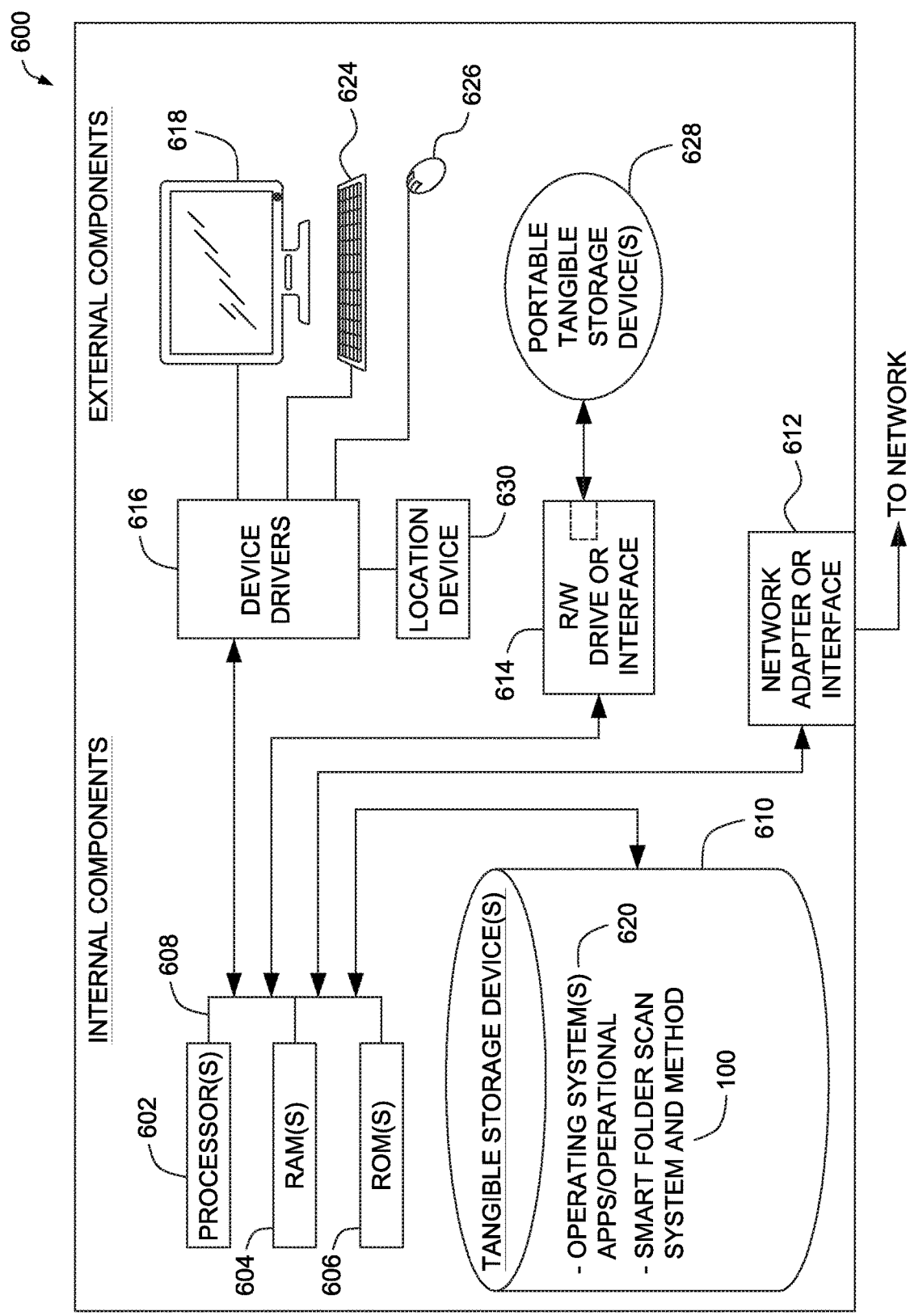
FIG. 6 is a block diagram of an embodiment of a computing device in which the modules of the smart folder scan system, described herein, are implemented.

The modules of the smart folder scan system 100 described herein are implemented in computing devices. One example of a computing device 600 is described below in FIG. 6. The computing device includes one or more processor 602, one or more computer-readable RAMs 604 and one or more computer-readable ROMs 606 on one or more buses 608. Further, computing device 600 includes a tangible storage device 610 that may be used to execute operating systems 620 and the smart folder scan system 100. The various modules of the smart folder scan system 100 includes a storage module 102, a processor 104 and a memory 112. The processor 104 further includes a scanning module 106, a folder activity map module 108 and a full scan selection module 110. The modules may be stored in tangible storage device 610. Both, the operating system 620 and the system 100 are executed by processor 602 via one or more respective RAMs 604 (which typically include cache memory). The execution of the operating system 620 and/or the system 100 by the processor 602, configures the processor 602 as a special purpose processor configured to carry out the functionalities of the operation system 620 and/or the smart folder scan system 100, as described above.

Examples of storage devices 628 include semiconductor storage devices devices such as ROM 606, EPROM, flash memory or any other computer-readable tangible storage device that may store a computer program and digital information.

Computing device also includes a R/W drive or interface 614 to read from and write to one or more portable computer-readable tangible storage devices 628 such as a CD-ROM, DVD, memory stick or semiconductor storage device. Further, network adapters or interfaces 612 such as a TCP/IP adapter cards, wireless Wi-Fi interface cards, or 3G or 4G wireless interface cards or other wired or wireless communication links are also included in computing device.

In one example embodiment, the smart folder scan system 100 which includes a storage module 102, a processor 104 and a memory 112. The processor 104 further includes a scanning module 106, a folder activity map module 108 and a full scan selection module 110, may be stored in tangible storage device 628 and may be downloaded from an external computer via a network (for example, the Internet, a local area network or other, wide area network) and network adapter or interface 612.

Computing device further includes device drivers 616 to interface with input and output devices. The input and output devices may include a computer display monitor 618, a keyboard 624, a keypad, a touch screen, a computer mouse 626, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A smart folder scan system comprising:
   a memory is configured to store computer-readable instructions;
   a storage module having a plurality of file folders configured to store data; and
   a processor communicatively coupled to the memory and the storage module, wherein the processor is configured to execute the computer-readable instructions to:
   access the plurality of file folders of the storage module;
   scan and identify one or more modified file folders of the storage module;
   generate a folder activity table for each of the plurality of file folders based upon the scan, wherein the folder activity table comprises a listing of the file folders and an associated modification time for each of the file folders;
   generate a skip table database based upon the modification time of each of the file folders, wherein the skip table database comprises a listing of one or more file folders to be skipped from a full scan;
   identify one or more file folders for the full scan based upon the folder activity table and the skip table database;
   perform the full scan of the identified one or more file folders;
   select file folders for a backup scan based upon an age based scan criteria; and
   scan each folder path present in the folder activity table to verify a change in the modification time.

2. The system of claim 1, wherein the storage module comprises a network added storage (NAS), storage for Linux and Unix operating systems, or combinations thereof.

3. The system of claim 1, wherein the processor is further configured to execute the computer-readable instructions to identify additional file folders based upon the modification time of the file folders listed in skip table database.

4. The system of claim 1, wherein the age based scan criteria comprises a user-defined probability based algorithm.

5. The system of claim 1, wherein the memory is further configured to store the folder activity table for each of the file folders present in the storage module.

6. The system of claim 1, wherein the memory is further configured to store the skip table database.

7. The system of claim 1, wherein the processor is configured to execute the computer-readable instructions to perform a full scan of a data set as a first backup of the storage module.

8. The system of claim 1, wherein the processor is further configured to execute the computer-readable instructions to:

remove one or more file folders from the skip table database based upon the modification time of the file folders; and add listing of the one or more removed file folders to the folder activity table.

9. The system of claim 1, wherein the folder activity table comprises a folder name, a folder modified time, a folder path, or combinations thereof for each of the file folders.

10. A method for scanning file folders of a storage module, the method comprising:

accessing a plurality of file folders of the storage module;

scanning the plurality of file folders and identifying one or more modified file folders in of the storage module;

generating a folder activity table for each of the plurality of file folders based upon the scan, wherein the folder activity table comprises a listing of the file folders and an associated modification time for each of the file folders;

identifying one or more file folders for a full scan based upon the folder activity table;

performing the full scan of the identified one or more file folders;

selecting file folders for a backup scan based upon an age based scan criteria; and scanning each folder path present in the folder activity table to verify a change in the modification time.

11. The method of claim 10, further comprising generating a skip table database based upon the modification time of each of the file folders, wherein the skip table database comprises a listing of one or more file folders to be skipped from the full scan.

12. The method of claim 11, comprising:

performing a periodic scan of the skip table database to identify additional folders based upon the modification time of the file folders listed in skip table database; and adding a listing of the additional folders to the folder activity table.

13. The method of claim 10, wherein generating the folder activity table comprises generating a listing of folder name, a folder modified time, a folder path, or combinations thereof for each of the file folders.

14. A smart folder scan system comprising:

a memory configured to store computer-readable instructions;

a network added storage having a plurality of file folders configured to store data, and a processor communicatively coupled to the memory and the network added storage, wherein the processor is configured to execute the computer-readable instructions to:

access the plurality of file folders stored in the network added storage;

scan and identify one or more modified file folders stored in the network added storage;

generate a folder activity table for each of the plurality of file folders based upon the scan, wherein the folder activity table comprises a listing of the file folders and an associated modification time for each of the file folders;

identify one or more file folders for a full scan based upon the folder activity table;

perform the full scan of the identified one or more file folders, select file folders for a backup scan based upon an age based scan criteria; and scan each folder path present in the folder activity table to verify a change in the modification time.

15. The system of claim 14, wherein the folder activity table comprises a folder name, a folder modified time, a folder path, or combinations thereof for each of the file folders.

16. The smart folder scan system of claim 14, wherein the processor is further configured to execute the computer-readable instructions to generate a skip table database based upon the modification time of each of the file folders, wherein the skip table database comprises a listing of one or more file folders to be skipped from a scan.

17. The smart folder scan system of claim 16, wherein the processor is further configured to execute the computer-readable instructions to identify one or more file folders for the full scan based upon the skip table database.

18. The system of claim 16, wherein the processor is further configured to execute the computer-readable instructions to:

perform a periodic scan of the skip table database:

identify additional file folders for scan based upon the modification time of the file folders listed in skip table database;

remove the additional file folders from the skip table database; and add listing of the one or more removed file folders to the folder activity table.

* * * * *